(12) United States Patent
Mehandjiysky et al.

(10) Patent No.: US 11,353,934 B2
(45) Date of Patent: Jun. 7, 2022

(54) MAGNETIC SUSPENSIONS FOR DISPLAYS

(71) Applicant: Hewlett-Packard Development Company, L.P., Spring, TX (US)

(72) Inventors: Dimitre D. Mehandjiysky, Spring, TX (US); Syed S. Azam, Spring, TX (US); Busarin Chumnong, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,310

(22) PCT Filed: Nov. 2, 2018

(86) PCT No.: PCT/US2018/058964
§ 371 (c)(1),
(2) Date: Nov. 2, 2020

(87) PCT Pub. No.: WO2020/091807
PCT Pub. Date: May 7, 2020

(65) Prior Publication Data
US 2021/0365074 A1     Nov. 25, 2021

(51) Int. Cl.
*G06F 1/16* (2006.01)

(52) U.S. Cl.
CPC .......... *G06F 1/1681* (2013.01); *G06F 1/1652* (2013.01); *G06F 1/1679* (2013.01)

(58) Field of Classification Search
CPC ..... G06F 1/1681; G06F 1/1652; G06F 1/1679
See application file for complete search history.

(56) References Cited

U.S. PATENT DOCUMENTS

| | | | |
|---|---|---|---|
| 8,514,042 B2* | 8/2013 | Lauder | H01F 7/0263 |
| | | | 335/304 |
| 9,064,431 B2 | 6/2015 | Ahn et al. | |
| 9,836,093 B2* | 12/2017 | Chen | G06F 1/1681 |
| 9,844,152 B2 | 12/2017 | Heo et al. | |
| 10,345,866 B2* | 7/2019 | Tucker | G06F 1/1654 |
| 2012/0075166 A1 | 3/2012 | Marti et al. | |
| 2014/0320393 A1 | 10/2014 | Modarres et al. | |

(Continued)

FOREIGN PATENT DOCUMENTS

| | | |
|---|---|---|
| CN | 106415432 | 2/2017 |
| EP | 2980674 A1 | 2/2016 |

(Continued)

*Primary Examiner* — Rockshana D Chowdhury
(74) *Attorney, Agent, or Firm* — Conley Rose P.C.

(57) ABSTRACT

Example computing devices are disclosed that include a first housing member rotatably coupled to a second housing member at a hinge. In addition, the computing devices include a display including first and second ends disposed on first and second sides of the hinge, respectively. Further, the computing devices include a first magnet disposed within the first housing member, and a controller disposed within the housing. The controller is coupled to the first magnet and is to actuate the first magnet to generate a magnetic field based on a position of the first housing member relative to the second housing member about the hinge. Additionally, the magnetic field is to attract or repel the first end of the display to translate the first end of the display relative to the hinge within the first housing member.

15 Claims, 10 Drawing Sheets

(56) References Cited

U.S. PATENT DOCUMENTS

| | | | |
|---|---|---|---|
| 2014/0321073 A1 | 10/2014 | Hong et al. | |
| 2015/0109223 A1 | 4/2015 | Kessler et al. | |
| 2015/0366089 A1 | 12/2015 | Park et al. | |
| 2016/0026221 A1* | 1/2016 | Lee | G06F 1/1618 361/679.29 |
| 2017/0200545 A1 | 7/2017 | Browne et al. | |
| 2017/0208157 A1* | 7/2017 | Kim | H04M 1/0216 |
| 2017/0220077 A1* | 8/2017 | Holung | G06F 1/1681 |
| 2017/0300084 A1* | 10/2017 | Morrison | G06F 1/1681 |
| 2017/0357292 A1 | 12/2017 | Cho et al. | |
| 2018/0267571 A1 | 9/2018 | Chen | |
| 2019/0004764 A1* | 1/2019 | Son | G06F 1/1654 |

FOREIGN PATENT DOCUMENTS

| | | |
|---|---|---|
| KR | 20160121118 | 10/2016 |
| TW | I618472 | 3/2018 |
| WO | 2018/008865 A1 | 1/2018 |

* cited by examiner

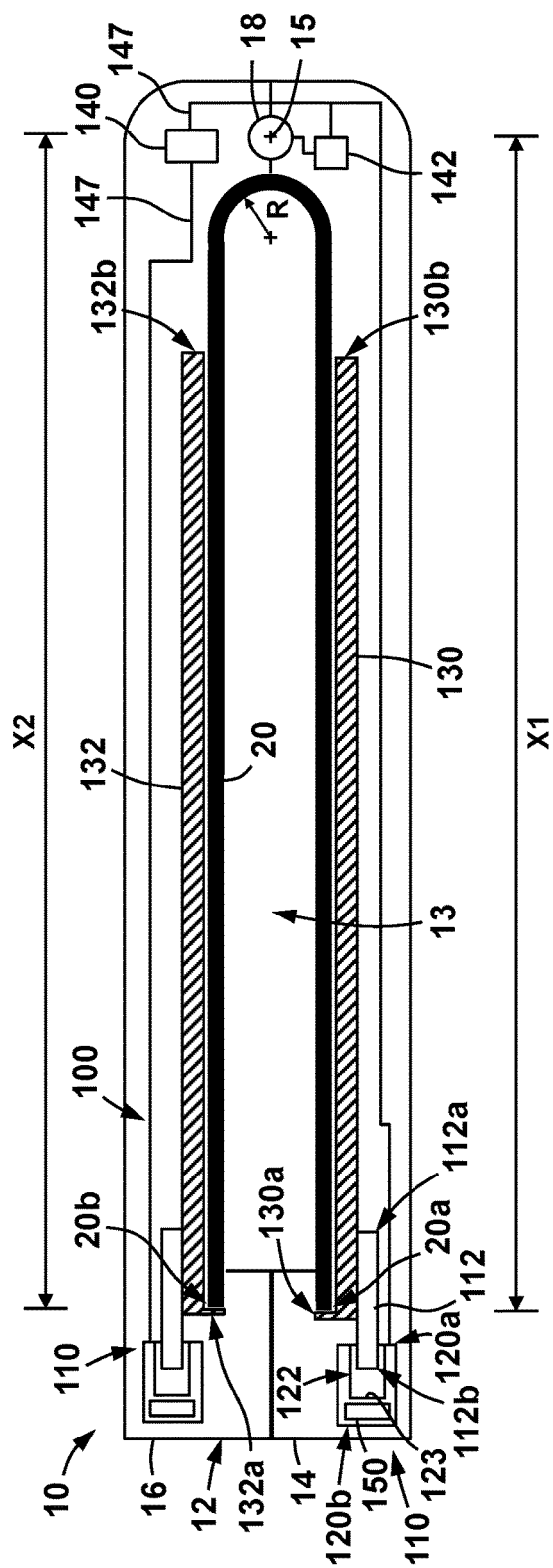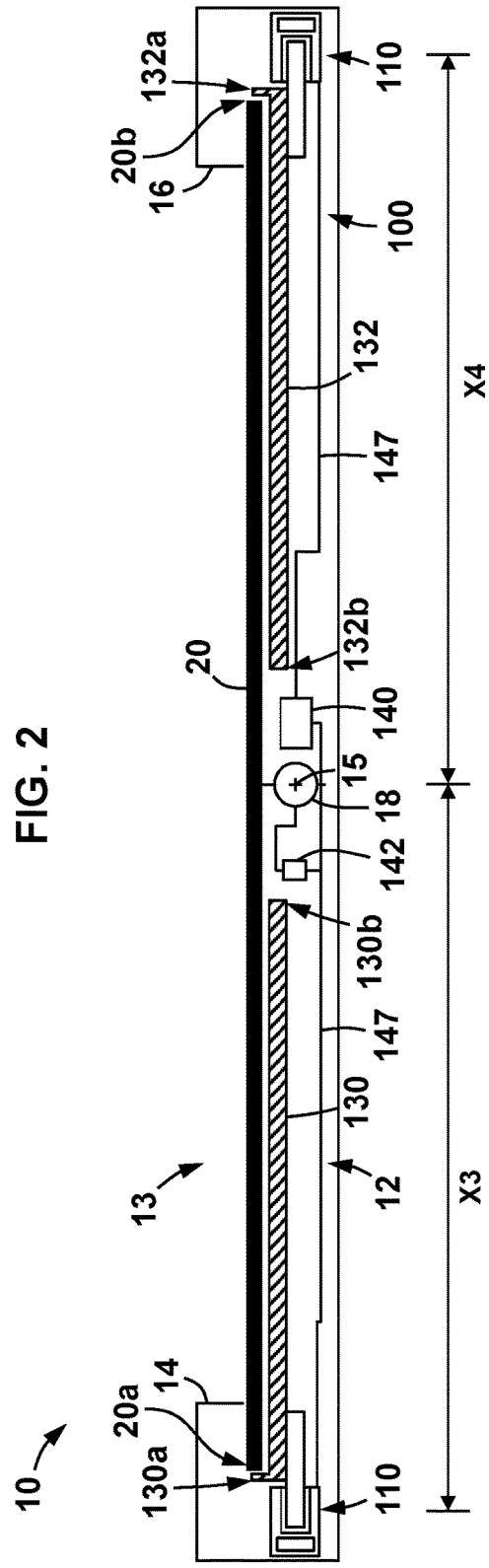

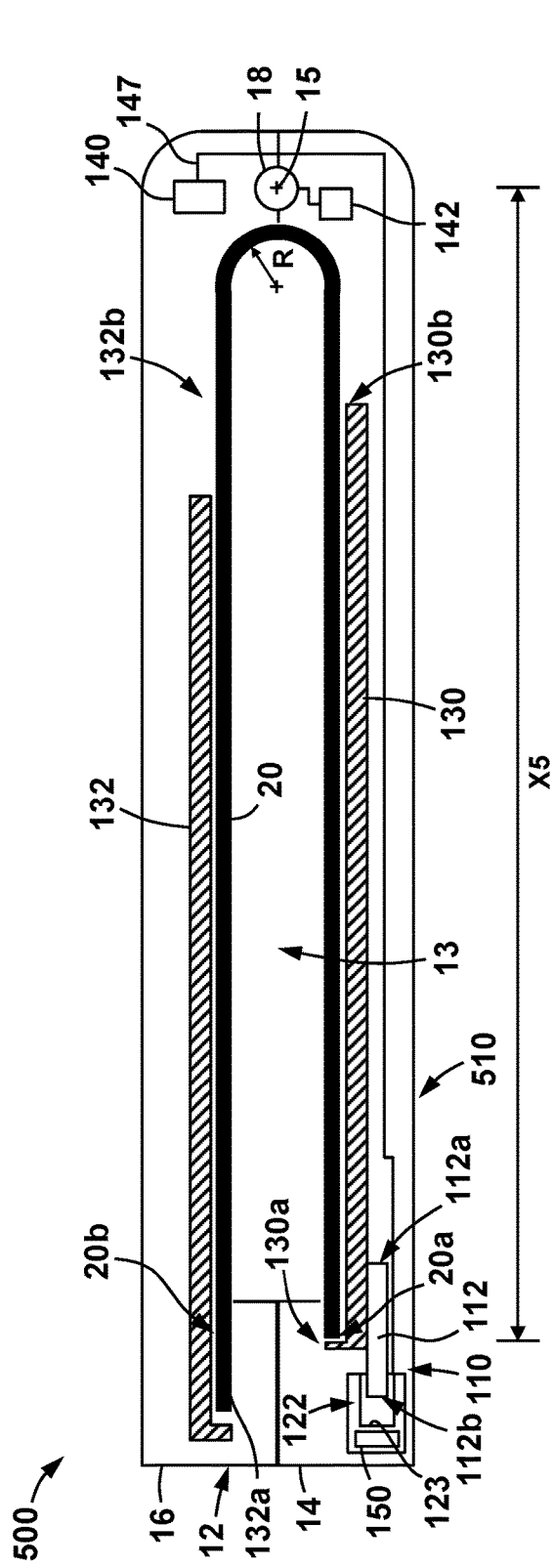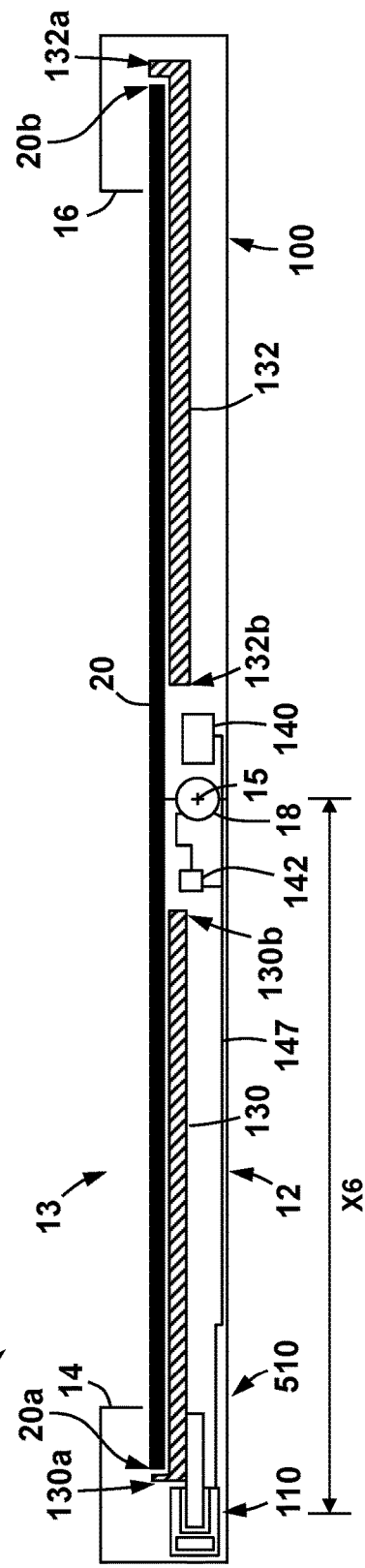

US 11,353,934 B2

MAGNETIC SUSPENSIONS FOR DISPLAYS

BACKGROUND

Computing devices may incorporate flexible displays that can be deformed (e.g., rolled, folded, etc.) without losing electric functionality and connectivity. Typically, such flexible displays may be deformed to a minimum radius of curvature before the display sustains damage.

BRIEF DESCRIPTION OF THE DRAWINGS

Various examples will be described below referring to the following figures:

FIG. 2 is an example schematic, partial cross-sectional view of the computing device of FIG. 1, with the housing of the computing device in a closed position;

FIG. 3 is an example schematic, partial cross-sectional view of the computing device of FIG. 1, with the housing of the computing device in an open position;

FIG. 10 is a schematic, partial cross-sectional view of a computing device including a flexible display and an associated suspension, with the housing of the computing device in a closed position according to some examples;

FIG. 11 is an example schematic, partial cross-sectional view of the computing device of FIG. 10, with the housing of the computing device in an open position.

DETAILED DESCRIPTION

Figure 1:
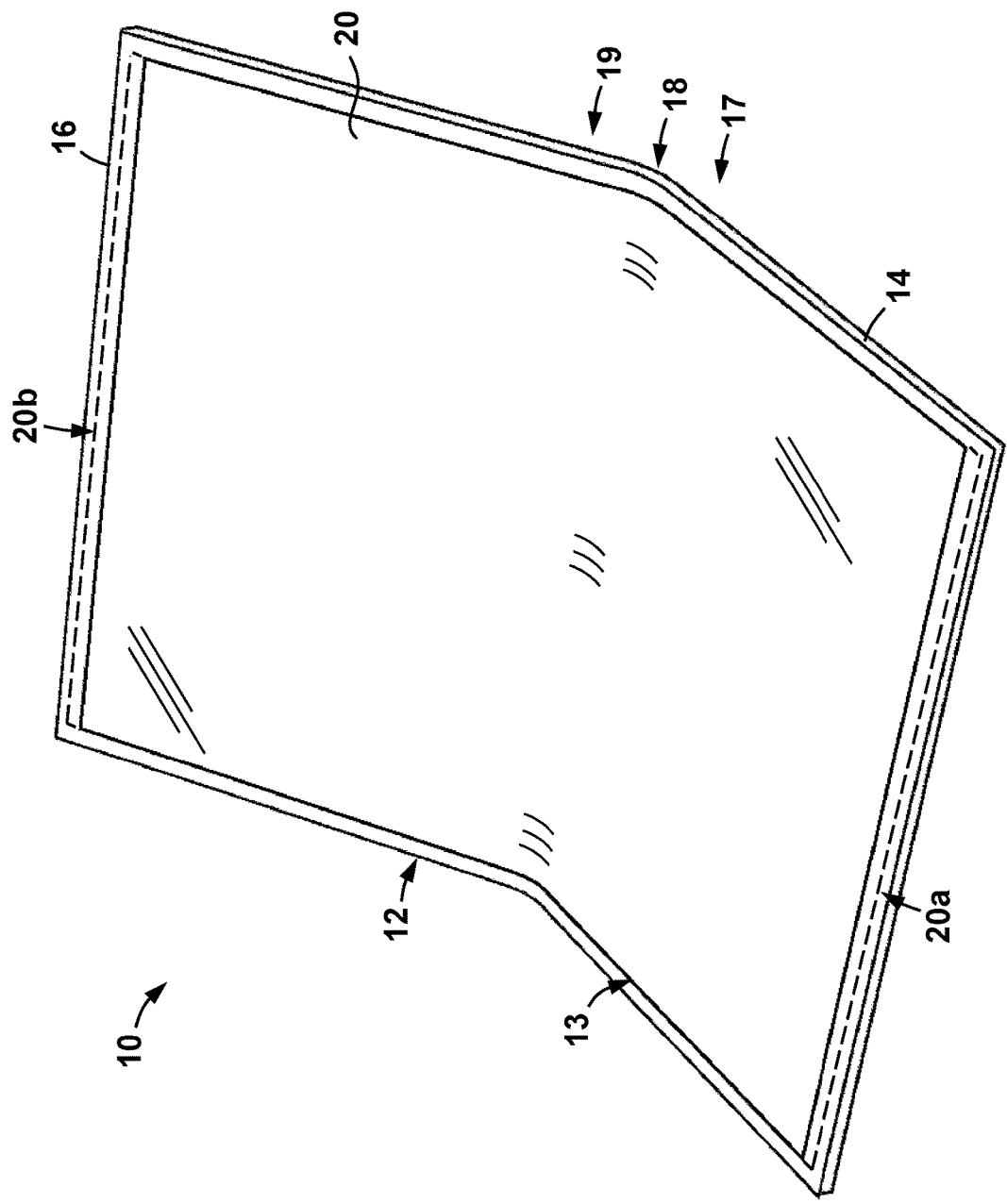
FIG. 1 is a perspective view of a computing device including a flexible display and an associated suspension according to some examples.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis.

As used herein, including in the claims, the word "or" is used in an inclusive manner. For example, "A or B" means any of the following: "A" alone, "B" alone, or both "A" and "B." In addition, when used herein (including the claims) the words "generally," "about," "approximately," or "substantially" mean within a range of plus or minus 20% of the stated value. As used herein, the term "display" refers to an electronic display (e.g., a liquid crystal display (LCD), a plasma display, etc.) that is to display images generated by an associated computing device. The term "flexible display" refers to an electronic display that may be deformed (e.g., rolled, folded, etc.) within a given parameter or specification (e.g., a minimum radius of curvature) without losing electrical function or connectivity. As used herein, the term "computing device," refers to an electronic device that is to carry out machine readable instructions, and may include internal components, such as, processors, power sources, memory devices, etc. For example, a computing device may include, among other things, a personal computer, a smart phone, a tablet computer, a laptop computer, a personal data assistant, etc. As used herein, the term "magnetically sensitive" in reference to a material refers to any material (or combination of materials) that experiences a physical force or impulse when placed in or near a magnetic field. The term includes ferromagnetic materials, but is not limited thereto.

As previously described, computing devices may incorporate a flexible display. Often such computing devices are transitionable between open and closed positions (e.g., such as is the case for a laptop style computing device) to facilitate transport and storage of the device when not in use. When the computing device is placed in the closed (often folded) position, the flexible display may be rolled or deformed. While the flexible display is generally capable of such a deformation, there are typically limits to the deformation such a display may experience. For example, if the display is deformed excessively (such as when the associated computing device is transitioned into a closed position), the display may be damaged. Accordingly, examples disclosed herein include computing devices utilizing flexible displays that employ magnetically actuated suspensions therein for facilitating an acceptable and controlled deformation of the flexible display as the computing device is transitioned to and between open and closed positions.

Referring now to FIG. 1, a computing device 10 according to some examples disclosed herein is shown. Computing device 10 includes a housing 12 and a flexible display 20 partially disposed within the housing 12.

Housing 12 includes a first housing member 14 and a second housing member 16. The first and second housing members 14, 16 are rotatably coupled to one another at a hinge 18. Thus, first housing member 14 may rotate about the hinge 18 relative to second housing member 16, and second housing member 16 may rotate about hinge 18 relative to first housing member 14.

Flexible display 20 (or more simply "display 20") is disposed within housing 12, but is accessible for viewing and interaction by a user through an opening 13 formed by the first housing member 14 and second housing member 16. Display 20 includes a first end 20a, and a second end 20b opposite first end 20a. First end 20a of display 20 is disposed on a first side 17 of hinge 18 within first housing member 14, and second end 20b of display 20 is disposed on a second, opposite side 19 of hinge 18 within second housing member 16.

Generally speaking, display 20 is to display images for viewing by the user based on machine readable instructions carried out by electronic components (e.g., processor(s)) (not specifically shown) within computing device 10. In this example, display 20 is a touch sensitive display that is to communicate with other electronic components (not shown) within computing device 10 to detect touch inputs by a user on display 20 during operations. In other examples, display 20 may not be touch sensitive. Display 20 may utilize any suitable display technology such as, for example, LCD, plasma, light emitting diode (LED)-LCD, organic-LED-LCD, etc.

In addition, as previously described, display 20 is a flexible display, and thus, display 20 may be deformed, rolled, etc., within acceptable parameters or specifications while maintaining electrical function and connectivity with other components (not shown) within computing device 10. Thus, when first housing member 14 and second housing member 16 are rotated about hinge 18 relative to one another as previously described above, display 20 is to deform (e.g., roll or bend) proximate to hinge 18 in order to accommodate the relative rotation between the housing members 14, 16.

Figure 4:
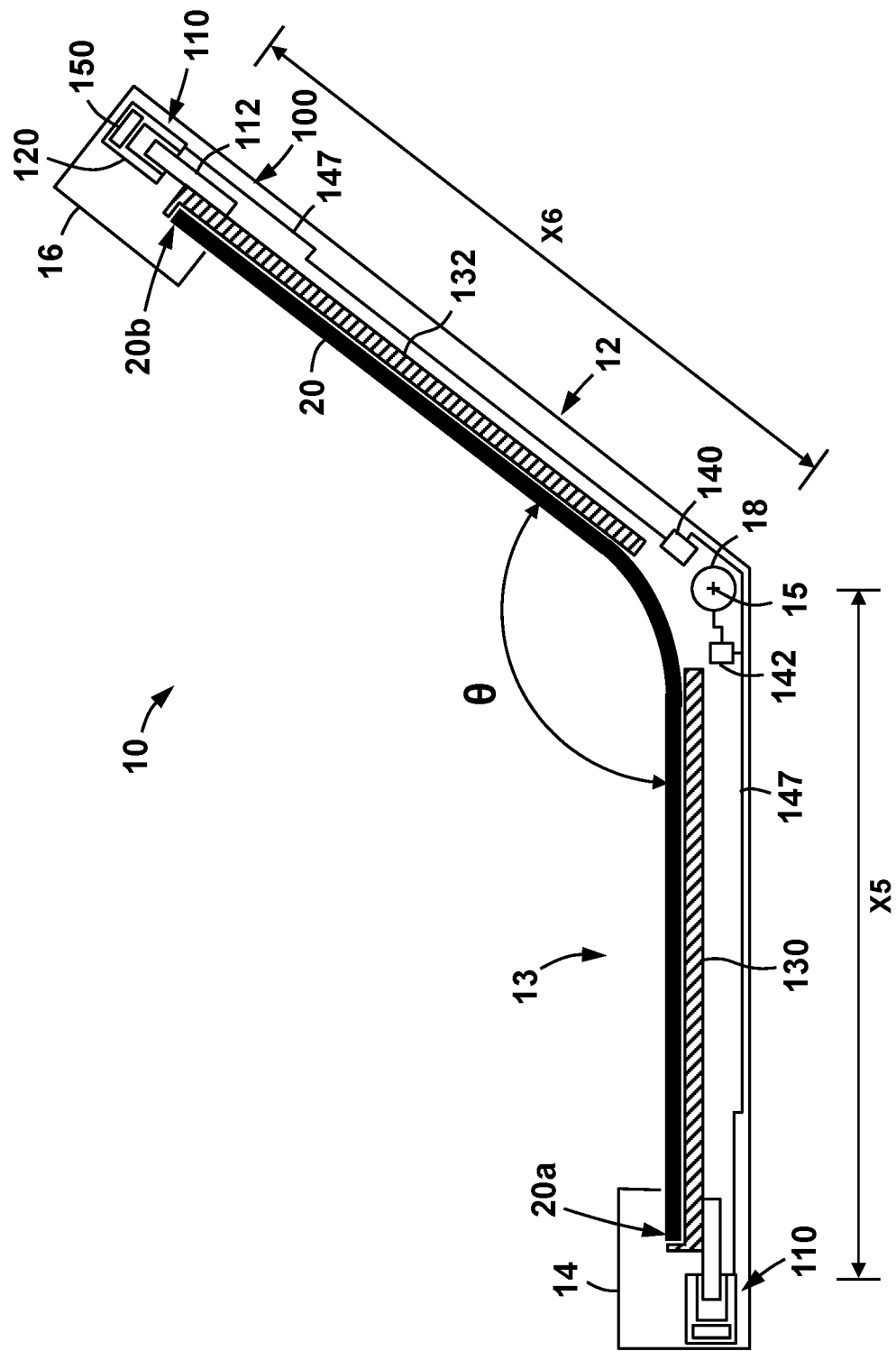
FIG. 4 is an example schematic, partial cross-sectional view of the computing device of FIG. 1, with the housing of the computing device in a neutral position between the closed position of FIG. 2 and the open position of FIG. 3.

Referring now to FIGS. 2-4, housing 12 of computing device 10 may be transitioned between a closed position (or folded position) as shown in FIG. 2, and an open position as shown in FIG. 3. In the closed position (see FIG. 2), the second housing member 16 is rotated about an axis of rotation corresponding to axis 15 of hinge 18, toward first housing member 14 until housing members 14, 16 are in contact with one another and display 20 is concealed by housing members 14, 16. In some examples, the closed position is useful for when a user is transporting the computing device 10 from one location to another or for when the computing device 10 is being stored within a bag or other compartment. In the open position (see FIG. 3), the second housing member 16 is rotated about axis 15 away from first housing member 14, to thereby expose display 20. In some examples, the open position may be useful for operation of the computing device 10 by a user.

It should be appreciated that a user may also operate the computing device 10 when it is in a position between the closed position of FIG. 2 and the open position of FIG. 3 (e.g., when the angle between the housing members 14, 16 is greater than 0° but less than 180°. In particular, referring specifically to FIG. 4, in some examples, housing 12 may have a neutral position that is between the fully closed position of FIG. 2, and the fully open position of FIG. 3. In particular, in the neutral position of FIG. 4, an angle θ between housing members 14, 16 may be greater than 0° and less than 180°. In some examples, the angle θ may range from 60° to 120° when housing 12 is in the neutral position of FIG. 4. It should be appreciated that the angle θ may be approximately equal to 0° when housing 12 is in the closed position of FIG. 2 and approximately equal to 180° when housing 12 is in the open position of FIG. 3. As previously described above, the neutral position of FIG. 4 may be associated with the operational position of the computing device 10. In other words, a user may place the housing 12 in the neutral position of FIG. 4 in order to facilitate typical use and interaction with the computing device 10 (including display 20).

When the computing device 10 is in the closed position (see FIG. 2), display 20 is deformed proximate to hinge 18 (note: in some examples, display 20 may be fixed to hinge 18 or a portion or component thereof). As previously described above, because display 20 is flexible, display 20 may generally deform without sustaining damage. However, the flexibility of display 20 has limits, such as, for example, a minimum radius of curvature, and it is typically desirable to maintain any deformation of display 20 within those limits to avoid damage thereto during operations. In particular, when housing 12 is transitioned to the closed position of FIG. 2 (e.g., from the open position of FIG. 3 or the neutral position of FIG. 4), display 20 is deformed or rolled at or proximate to hinge 18 to a desired radius of curvature R. The radius R may be greater than 0 mm and less than or equal to 5 mm in some examples; however, it should be appreciated that the value of R may be greater than 5 mm in other examples (and thus radius may be referred to herein as a "non-zero radius"). In some examples, the radius R is set or determined by the minimum radius of curvature that display 20 may occupy without sustaining damage or losing electrical function or connectivity.

Thus, computing device 10 includes a suspension 100 to facilitate the controlled deformation of display during the transition of housing 12 between the open and closed positions (e.g., including to or through the neutral position of FIG. 4), so as to avoid damaging display 20 due to an excess deformation thereof. In addition, suspension 100 also provides support to display 20 when housing 12 is in the closed position of FIG. 2, the open position of FIG. 3, or in the neutral position of FIG. 4. In particular, for display 20 to form and accommodate the desired radius R of display 20 when housing 12 is transitioned toward or to the closed position in FIG. 2, ends 20a, 20b translate or move along housing members 14, 16, respectively, toward hinge 18 (or toward axis 15 of hinge 18). Therefore, suspension 100 generally includes a plurality of magnetic actuation assemblies 110 that are to synchronously attract or repel ends 20a, 20b of display 20 based on the relative angular position of the first and second housing members 14, 16 about hinge 18. Accordingly, suspension 100 may cause display 20 to uniformly and evenly deform within desired limits as the housing 12 is transitioned between the closed, open, and neutral positions. The components and function of suspension 100 (including the magnetic actuation assemblies 110) will now be described in more detail below.

Referring still to FIGS. 2-4, in addition to magnetic actuation assemblies 110, suspension 100 includes display support members 130, 132. Display support members 130, 132 are coupled to display 20 and are to provide support to display 20 during operations. For example, support members 130, 132 may facilitate the touch sensitivity of display 20 (for implementations in which display 20 is a touch sensitive display) by providing a rigid backing to display 20 (so that a user's touch event may be properly registered by display 20 during use). In addition, support members 130, 132 may also distribute loads transferred from other components within computing device 10 over a relatively large surface area of display 20, so that damage or wear to display 20 is reduced or minimized.

In this example, first display support member 130 is disposed within first housing member 14, and second display support member 132 is disposed within second housing member 16. First display support member 130 includes a first end 130a that is proximate first end 20a of display 20 and a second end 130b that is more proximate hinge 18 than first end 130a. Additionally, second display support member 132 includes a first end 132a that is proximate second end 20b of display 20 and a second end 132b that is more proximate hinge 18 than first end 132a.

Referring still to FIGS. 2-4, each magnet actuation assembly 110 comprises a first actuation member 112 and a second actuation member 120. Either or both of the actuation members 112, 120 may include or incorporate a magnet 150 (e.g., an electromagnet) therein. In this example, second actuation member 120 includes an electromagnet 150, and first actuation member 112 is constructed (wholly or partially) of a magnetically sensitive material. In some implementations, first actuation member 112 may comprise a metal (e.g., iron, nickel, iron oxide, ferrite, etc.).

More specifically, in this example, first actuation member 112 is an elongate member (e.g., a rod, post, bar, etc.) that is coupled (e.g., either directly or indirectly) to a corresponding one of the display support members 130, 132, at the first ends 130a, 132a, respectively. In other words, the first actuation member 112 of the magnetic actuation assembly 110 disposed within first housing member 14 is coupled to the display support member 130 at first end 130a, and the first actuation member 112 of the magnetic actuation assembly 110 disposed within second housing member 16 is coupled to the display support member 132 at first end 132a. In other examples, first actuation member 112 may be coupled directly to display 20 (e.g., such as in examples that do not include display support members 130, 132). Each first actuation member 112 includes a first or proximal end 112a coupled to the respective display support member 130, 132, and a second or distal end 112b that is opposite proximal end 112a.

Second actuation member 120 of each magnetic actuation assembly 110 is a hollow (or semi hollow) member that is mounted within a corresponding one of the housing members 14, 16. In this example, each second actuation member 120 includes a first or open end 120a and a second or closed end 120b opposite open end 120a. A recess or hollow 122 extends into second actuation member 120 from open end 120a to a terminal end 123. As will be described in more detail below, distal end 112b of first actuation member 112 is received within recess 122 during operations. In addition, magnet 150 is disposed within or on second actuation member 120 proximate terminal end 123 of recess 122. In this example, magnet 150 is an electromagnet as previously described above, and thus may selectively generate a variable magnetic field based on the flow of electric current therethrough. Accordingly, magnet 150 may generate a magnetic field that either attracts distal end 112b of first actuation member 112 toward terminal end 123 of recess 122 or repels distal end 112b of first actuation member 112 away from terminal end 123 of recess 122. As will be described in more detail below, because proximal end 112a of first actuation member 112 of each magnetic actuation assembly 110 is each coupled to a corresponding one of the display support members 130, 132, which are in turn coupled to ends 20a, 20b, respectively, of display 20, the magnetic field generated by magnet 150 within each magnetic actuation assembly 110 may force a corresponding end 20a, 20b of display 20 to translate within housing members 14, 16, respectively, relative to hinge 18.

Figure 5:
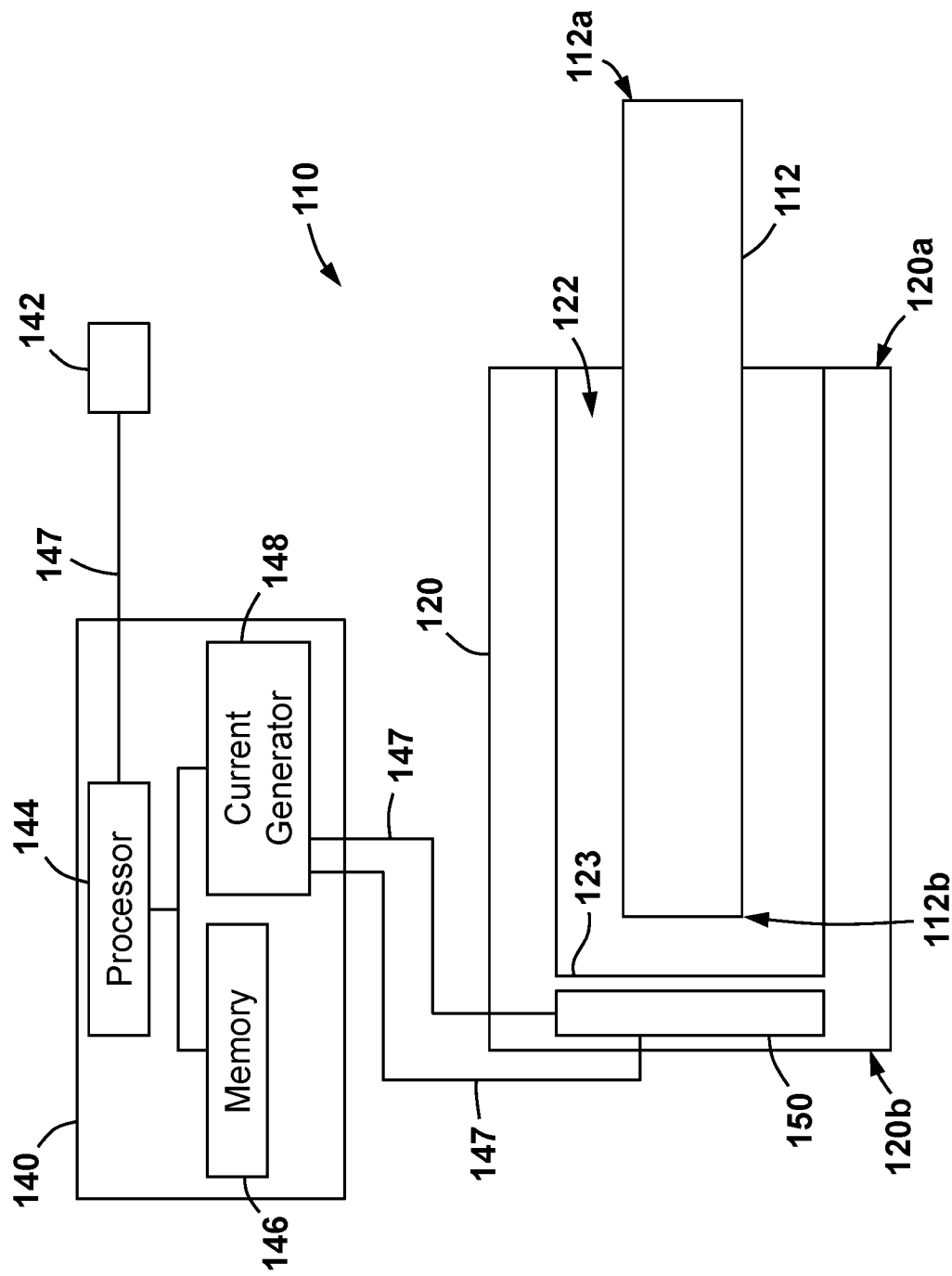
FIG. 5 is a schematic view of an example magnetic actuation assembly of the suspension of the computing device of FIG. 1, electrically coupled to a controller and an angular position sensor.

Referring now to FIGS. 2-5, suspension 100 also includes a controller 140 and an angular position sensor 142 that are disposed within housing 12. FIG. 5 schematically depicts one of the magnetic actuation assemblies 110 electrically coupled to controller 140 in order to simplify the figure, but it should be appreciated that the other magnetic actuation assembly 110 would also be electrically coupled to controller 140 in the same manner. In addition, other than controller 140, sensor 142, and one magnetic actuation assembly 110, FIG. 5 does not depict the remaining components of computing device 10 (e.g., display 20, housing 12, display support members 130, 132, etc.), so as to simply the figure. Moreover, it should be appreciated that a plurality of sensors 142 may be included within computing device 10 in other examples.

Sensor 142 is to sense or detect the rotational or angular position of one of the housing members 14, 16 relative to the other of the housing members 14, 16 about hinge 18. In some examples, sensor 142 directly detects the relative angular position of one of the housing members 14, 16 (or both of the housing members 14, 16). In other examples, sensor 142 detects an indication of the relative angular position of one of the housing members 14, 16 or both of the housing members 14, 16. In one specific example, the sensor 142 may comprise an accelerometer, such as, for example a 3-axis accelerometer) that is to measure or detect the yaw, pitch, and roll of one of the housing members 14, 16 relative to the direction of gravity (e.g., the direction of the gravitational field vector). In this example, the output from the sensor 142 may be used (e.g., by controller 140) to determine the orientation of the corresponding housing member 14, 16 relative to the other housing member 14, 16. In still other examples, each of the housing members 14, 16 may include a corresponding accelerometer (e.g., again a 3-axis accelerometer) (e.g., so that computing device 10 may comprise a plurality of sensors 142). In these examples, the output from the accelerometers may be used (e.g., by controller 140) to determine the orientation of both of the housing members 12, 14.

Controller 140 is coupled to angular position sensor 142 and to the magnet 150 of each magnetic actuation assembly 110. Generally speaking, controller 140 receives signals from sensor 142, and actuates the magnet 150 within each magnetic actuation assembly 110 to generate a magnetic field as previously described. Controller 140 may be a corresponding dedicated controller for suspension 100 or may be included or integrated within a central controller or control assembly for computing device 10. In this example, controller 140 is a dedicated controller for suspension 100 and may communicate with other controllers or control assemblies within computing device 10 (e.g., such as those that facilitate general operation of computing device 10, including display 20). The specific components and functions of controller 140 will now be described in detail below with continued specific reference to FIGS. 2-5.

In particular, controller 140 may comprise any suitable device or assembly which is capable of receiving an electrical or mechanical signal and capable of transmitting various signals to other devices (e.g., magnet 150, sensor 142, etc.). In particular, as shown in FIG. 5, in this example, controller 140 includes a processor 144, a memory 146, and a current generator 148.

The processor 144 (e.g., microprocessor, central processing unit, or collection of such processor devices, etc.) executes machine readable instructions provided on memory 146, and (upon executing the instructions) provides the controller 140 with all of the functionality described herein.

The memory 146 may comprise volatile storage (e.g., random access memory), non-volatile storage (e.g., flash storage, read only memory, etc.), or combinations of both volatile and non-volatile storage. Data consumed or produced by the machine readable instructions can also be stored on memory 146.

Current generator 148 is coupled to processor 144 and memory 146 and is to generate and transmit an electrical current to magnet 150 within magnetic actuation assemblies 110 based on instructions or commands provided by processor 144. In this example, magnet 150 is an electromagnet, and thus, when electric current is provided to magnet 150 from current generator 148, magnet 150 generates a corresponding magnetic field. The strength of the magnetic field generated by magnet 150 may be adjusted by increasing or decreasing the current flowing across magnet 150 that is supplied by the current generator 148. In addition, the polarity of the magnetic field may be changed (e.g., reversed) by changing (e.g., reversing) the direction the electric current supplied by current generator flows across magnet 150. In some examples, when the magnet 150 is an electromagnet, the magnet 150 may comprise a coil of conductive wire (e.g., copper).

Referring still to FIGS. 2-5, controller 140 may also include or be coupled to a suitable power source (not shown), that provides electrical power to other electronic components within controller 140 (and perhaps other components within computing device 10). In particular, the power source (not shown) may comprise any suitable source of electrical power such as, for example, a battery, capacitor, utility power source, etc. It should be appreciated that if the power source (not shown) is a utility power source (e.g., such as electrical power provided by a wall plug within a building or residence), then the power source is not located within computing device 10 itself.

Controller 140 is coupled or linked to magnet 150 and sensor 142 by a plurality of conductors 147, which may comprise any suitable conductive element for transferring power and/or control signals (e.g., electrical signals, light signals, etc.). For example, in some implementations, conductors 147 may comprise conductive wires (e.g., metallic wires), fiber optic cables, or some combination thereof. In other examples, controller 140 is to communicate with magnet 150 and/or sensor 142 via a wireless connection (e.g., WIFI, BLUETOOTH®, near field communication, infrared, radio frequency communication, etc.).

As will be described in more detail below, during operations controller 140 actuates the magnet 150 of each magnetic actuation assembly 110 to selectively generate a corresponding magnetic field that drives the movement or translation of ends 20a, 20b of display 20 as previously described. As will also be described in more detail below, controller 140 may actuate the magnet 150 as a function of the relative angular positions of the housing members 14, 16, based on the output from sensor 142.

Referring still to FIGS. 2-5 when the housing 12 of computing device 10 is in the neutral position of FIG. 4, the controller 140 may actuate the magnet 150 of each magnetic actuation assembly 110 to generate little or no magnetic field. Thus, in some of these examples, when housing 12 is in the neutral position of FIG. 4, processor 144 directs current generator 148 to stop the flow of electric current to magnet 150.

Referring specifically now to FIGS. 3, 4, and 5, when the housing 12 is transitioned from the neutral position of FIG. 4 to the open position of FIG. 3, controller 140 senses the relative movement and/or position of housing members 14, 16 about hinge 18 via sensor 142 and actuates magnet 150 (via current generator 148) within each magnetic actuation assembly 110 to generate a magnetic field that attracts distal end 112b of the corresponding first actuation member 112 toward the terminal end 123 of the recess 122 within the corresponding second actuation member 120. Because each first actuation member 112 is a corresponding one of the coupled to display support members 130, 132, and display support members 130, 132 are in turn coupled to display 20 as previously described, the attraction of distal end 112b of each first actuation member 112 toward terminal end 123 of the corresponding recess 122 also moves or translates ends 20a, 20b of display 20 away from hinge 18. Thus, the magnetic field generated by magnet 150 of each magnetic actuation assembly 110 when housing 12 is transitioned from the neutral position (FIG. 4) to the open position (FIG. 3) attract end 20a, 20b of display 20 away from hinge 18 within housing members 14, 16, respectively.

Referring specifically now to FIGS. 2, 4, and 5, when the housing 12 is transitioned from the neutral position of FIG. 4 to the closed position of FIG. 2, controller 140 again senses the relative movement and/or position of housing members 14, 16 about hinge 18 via sensor 142 and actuates magnet 150 (via current generator 148) of each magnetic actuation assembly 110 to generate a magnetic field that repels distal end 112b of the corresponding first actuation member 112 away from terminal end 123 of the recess 122 within the corresponding second actuation member 120. This in turn also moves or translates ends 20a, 20b of display 20 toward hinge 18 (or repels ends 20a, 20b toward hinge 18). Thus, the magnetic field generated by the magnet 150 of each magnetic actuation assembly 110 when housing 12 is transitioned from the neutral position (FIG. 4) to the closed position (FIG. 2) repels ends 20a, 20b of display 20 toward from hinge 18 within housing members 14, 16, respectively.

Referring again to FIGS. 2-5, in some examples, controller 140 may actuate each magnet 150 to adjust the strength of the magnetic field generated thereby (e.g., by increasing or decreasing the electric current supplied to magnet 150 by current generator 148 as previously described) to either attract or repel the distal end 112b of the corresponding first actuation member 112 relative to terminal end 123 of the corresponding recess 122 based on the position of housing 12. More specifically, depending on the relative angular positions of housing members 14, 16, controller 140 may increase and/or decrease the strength of the repelling or attracting magnetic field generated by each magnet 150 as appropriate to ensure that ends 20a, 20b of display 20 are positioned relative to hinge 18 as desired and to ensure that sufficient tension or compression is placed on display 20 to facilitate user interactions and operations.

For example, in some implementations as the angle $\theta$ between housing members 14, 16 increases while housing 12 is transitioned from the neutral position of FIG. 4 toward the open position of FIG. 3, controller 140 adjusts the strength of the magnetic field generated by each magnet 150 such that the magnitude of the attractive forces applied to the distal end 112b of each first actuation member 112 toward terminal end 123 of the corresponding recess 122 progressively increases. Conversely, as the angle $\theta$ between housing members 14, 16 decreases while housing 12 is transitioned from the open position of FIG. 3 toward the neutral position of FIG. 4, controller 140 adjusts the strength of the magnetic field generated by each magnet 150 such that the magnitude of the attractive forces applied to the distal end 112b of each first actuation member 112 toward terminal end 123 of the corresponding recess 122 progressively decreases. Thus, in this example, the controller 140 is to actuate magnetic actuation assembly 110 to apply a maximum attractive magnetic force when housing 12 is in the fully open position of FIG. 3 and to apply a minimum attractive magnetic force (which may be zero) when housing 12 is in the neutral position of FIG. 4.

As another example, as the angle θ between housing members 14, 16 decreases while housing 12 is transitioned from the neutral position of FIG. 4 toward the closed position of FIG. 2, controller 140 adjusts the strength of the magnetic field generated by each magnet 150 such that the magnitude of the repelling forces applied to the distal end 112b of each first actuation member 112 away from terminal end 123 of the corresponding recess 122 progressively increases. Conversely, as the angle θ between housing members 14, 16 increases while housing 12 is transitioned from the closed position of FIG. 2 toward the neutral position of FIG. 4, controller 140 adjusts the strength of the magnetic field generated by each magnet 150 such that the magnitude of the repelling forces applied to the distal end 112b of each first actuation member 112 away from terminal end 123 of the corresponding recess 122 progressively decreases. Thus, the controller 140 is to actuate the magnet 150 within each magnetic actuation assembly 110 to apply a maximum repelling magnetic force to ends 20a, 20b of display 20 when housing 12 is in the fully closed position of FIG. 2 and to apply a minimum repelling magnetic force (which may be zero) when housing 12 is in the neutral position of FIG. 4.

Accordingly, in these examples, controller 140 is to actuate the magnet 150 in each magnetic actuation assembly 110 to repel the corresponding end 20a, 20b of display 20 toward hinge 18 when housing 12 is disposed between the neutral position of FIG. 4 and the closed position of FIG. 2, and to progressively increase the repelling force applied by each magnetic actuation assembly 110 to the corresponding end 20a, 20b as the housing 12 is transitioned from the neutral position (FIG. 4) toward the closed position (FIG. 2). In addition, in these examples, controller 140 is to actuate the magnet 150 in each magnetic actuation assembly 110 to attract the corresponding end 20a, 20b of display 20 away from hinge 18 when housing 12 is disposed between the neutral position of FIG. 4 and the open position of FIG. 3, and to progressively increase the attractive force applied by each magnetic actuation assembly 110 to the corresponding end 20a, 20b as the housing 12 is transitioned from the neutral position (FIG. 4) toward the open position (FIG. 3). Accordingly, magnetic actuation assemblies 110 (namely magnets 150) together operate to synchronously move ends 20a, 20b of display 20 relative to hinge 18 and housing members 14, 16 to accommodate radius R when housing 12 is in the closed position (see FIG. 2) and to extend display 20 for viewing and interaction by a user when housing 12 is in the open position (see FIG. 3).

Because the above described actuation of the magnet 150 in each magnetic actuation assembly 110 is tied to the motion of housing members 14, 16 about hinge 18 (e.g., as measured or detected by sensor 142 as previously described), the ultimate motion or movement of ends 20a, 20b of display 20 is synchronized with the movement of housing 12 about hinge 18. Without being limited to this or any other theory, the synchronous movement of ends 20a, 20b during rotation of housing members 14, 16 about hinge 18 may help to facilitate a repeatable, even, and uniform movement of display 20, so that irregular and undesired deformation of display 20 may be avoided.

Referring again to FIGS. 2-4, when housing 12 is in the closed position of FIG. 2, first end 20a of display 20 is disposed at a distance X1 from axis 15 of hinge 18 along first housing member 14, and second end 20b of display 20 is disposed at a distance X2 from axis 15 along second housing member 16. When housing 12 is in the open position of FIG. 3, first end 20a of display 20 is disposed at a distance X3 from axis 15 along first housing member 14, and second end 20b of display 20 is disposed at a distance X4 from axis 15 along second housing member 16. In this example, the distances X1, X2, X3, X4 are measured radially from axis 15 of hinge 18 and the ends (e.g., ends 20a, 20b) of display 20. In addition, in this example the distance X1 is less than the distance X3 (i.e., X1<X3), and the distance X2 is less than the distance X4 (i.e., X2<X4). Without being limited to this or any other theory, the difference between distance X1 and distance X3 and the difference between distance X2 and distance X4 is determined by the size of radius R when housing 12 is in the closed position. Thus, for larger values of the radius R, the difference between distances X1 and X3 and between distances X2 and X4 should be larger (since more length of display 20 is taken up to form the larger radius R). Also, in some examples, because the movement of ends 20a, 20b of display 20 are synchronized with one another via suspension 100 (particularly via magnetic actuation assemblies 110) as previously described, the difference between distances X1 and X3 may be equal (or substantially equal) to the difference between distances X2 and X4.

Further, when housing 12 is in the neutral position of FIG. 4, the first housing member 14 and second housing member 16 extend such that the angle θ may generally range between 60° and 120° as previously described above. In addition, because the attractive or magnetic forces applied by the magnet 150 within each magnetic actuation assembly 110 is at a minimum value (which again may include zero) when housing 12 is in the neutral position of FIG. 4, ends 20a, 20b of display 20 are also moved (via suspension 100) to positions that are between the positions of ends 20a, 20b while housing 12 is in the closed position of FIG. 2 and the open position of FIG. 3.

More particularly, when housing 12 is in the neutral position of FIG. 4, first end 20a of display 20 is disposed at a distance X5 from axis 15 of hinge 18 along first housing member 14, and second end 20b of display 20 is disposed at a distance X6 from axis 15 of hinge 18 along second housing member 16. As with distances X1-X4 in FIGS. 2 and 3, the distances X5 and X6 are measured in a radial direction from axis 15. In this example, the distance X5 is less than the distance X3 (see FIG. 3) but is greater than the distance X1 (see FIG. 2) (i.e., X3>X5>X1). Also, in this example, the distance X6 is less than the distance X4 (see FIG. 3) but is greater than the distance X2 (see FIG. 2) (i.e., X4>X6>X2).

In still other examples, first and second housing members 14 and 16, respectively, may be further rotated relative to one another such that housing 12 is in a "tent" type position, with first housing member 14 and second housing member 16 extending from hinge 18 at a relative angle greater than 180°. For instance, referring now to FIG. 6, an example of computing device 10 is shown where housing members 14, 16 are rotated about the hinge 18 such that the angle θ therebetween is greater than 180°, such as, for example, between 180° and 270° (e.g., 180°<θ<270°. In this position, once housing members 14, 16 are rotated past 180° (i.e., past the open position of FIG. 3), the controller 140 actuates the magnet 150 of each magnetic actuation assembly 110 to generate a magnetic field that again repels distal end 112b of each first actuation member 112 away from terminal end 123 of the corresponding recess 122, such that ends 20a, 20b of display 20 move again toward hinge 18 (e.g., such as described above for the movement of ends 20a, 20b when transitioning housing 12 from the neutral position of FIG. 4 to the closed position of FIG. 2). Specifically, ends 20a, 20b of display 20 may be repelled toward hinge 18 along housing members 14, 16, respectively, by magnetic actuation assemblies 110 in order to accommodate a roll or deformation 21 of display 20 at or proximate hinge 18 due to the movement of housing members 14, 16 as shown in FIG. 6.

Figure 6:
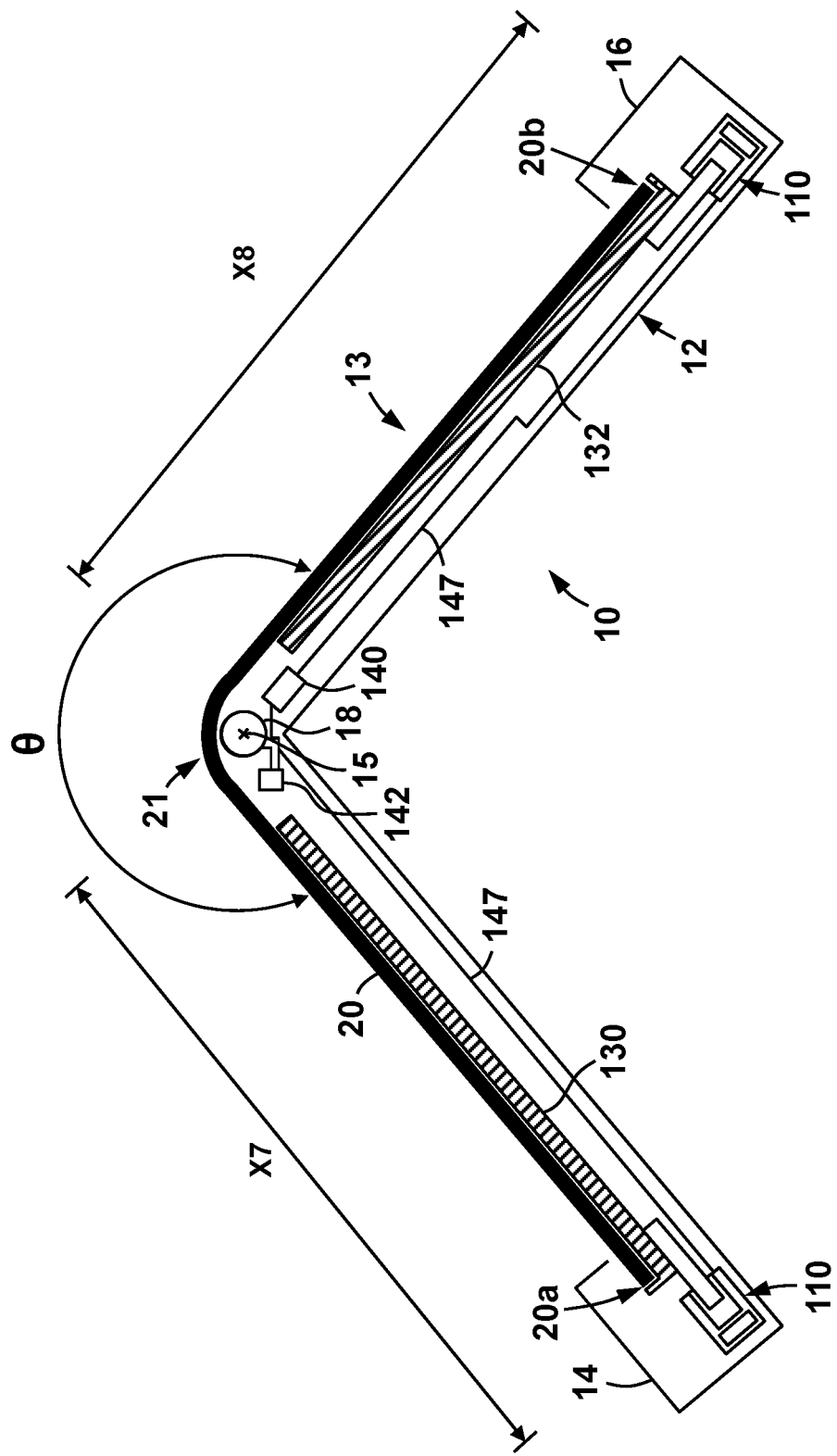
FIG. 6 is a schematic, partial cross-sectional view of an example of the computing device of FIG. 1, with the housing of the computing device in a tent-type position.

More particularly, when housing 12 is in the position of FIG. 6, first end 20a of display 20 is disposed at a distance X7 from axis 15 along first housing member 14, and second end 20b of display 20 is disposed at a distance X8 from axis 15 along second housing member 16. As with distances X1-X6 in FIGS. 2-4, the distances X7 and X8 are measured in a radial direction from axis 15. In addition, in this example, the distance X7 is less than the distance X3 (i.e., X7<X3), and the distance X8 is less than the distance X4 (i.e., X8<X4). Thus, as with the positions of housing 12 in the examples of FIGS. 2-4, it should be appreciated that suspension 100 (namely magnetic actuation assemblies 110) facilitates the relative, synchronous movement of ends 20a, 20b of display 20 while housing members 14, 16 are rotated past 180° relative to one another about hinge 18, such as shown in FIG. 6.

While examples disclosed herein have included a single magnet 150 within each magnetic actuation assembly 110, it should be appreciated that a plurality of magnets 150 may be included within each magnetic actuation assembly 110 in other implementations to facilitate the movement of ends 20a, 20b of display 20 as previously described above. Various examples of magnetic actuation assemblies 110 (e.g., magnetic actuation assemblies 210, 310, 410) are discussed below with reference to FIGS. 7-9. As previously described for FIG. 5, FIGS. 7-9 schematically show controller 140 electrically coupled to a corresponding magnetic actuation assembly, and do not depict either the other magnetic actuation assembly or the other components of the corresponding computing device (e.g., housing 12, display 20, display support members 130, 132, etc.) so as to simply the figures. However, it should be appreciated that these omitted components and features may be included in the same manner as previously described above with reference to FIGS. 1-4, and 6.

Figure 7:
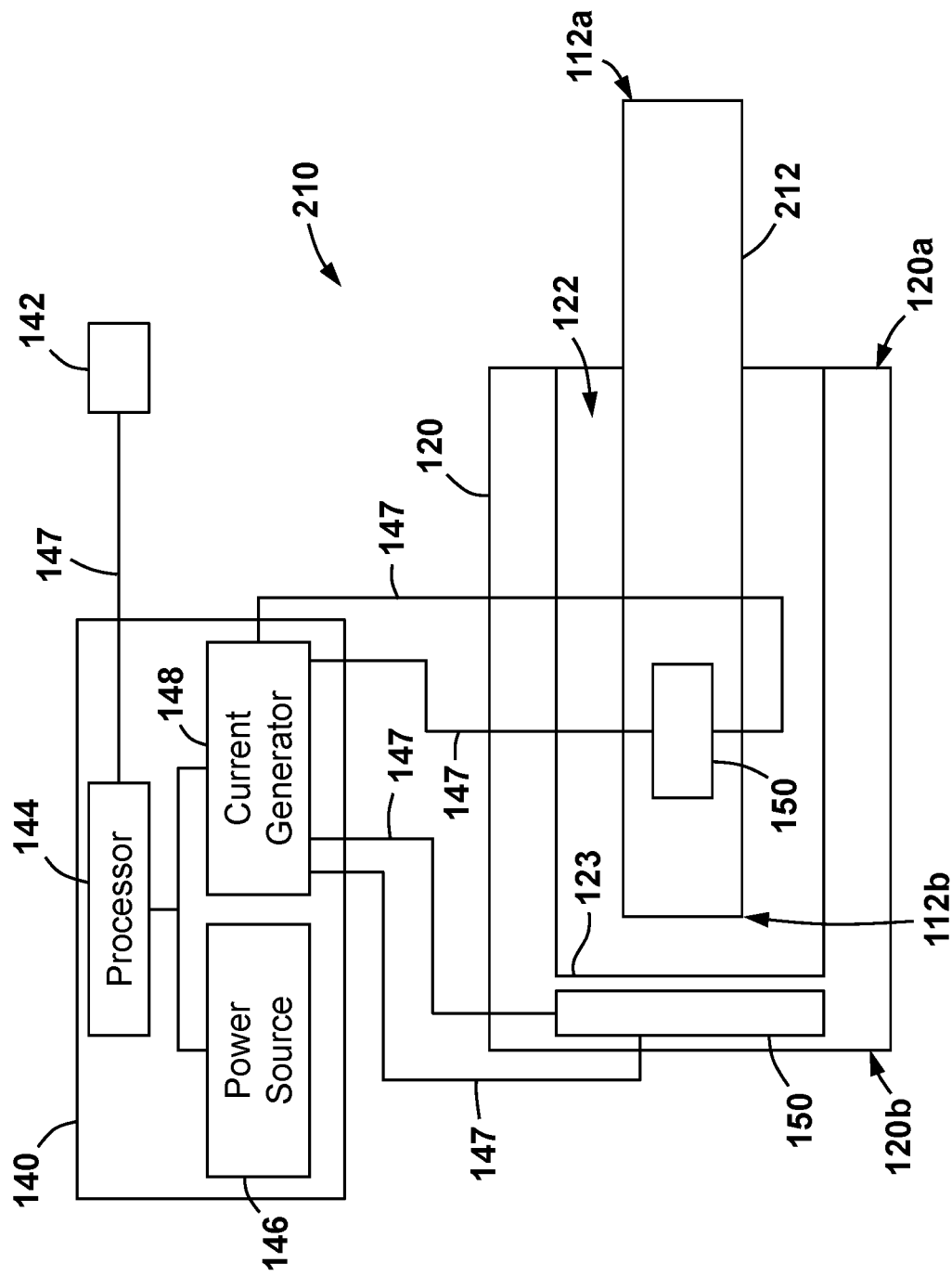
FIG. 7 is a schematic view of another example magnetic actuation assembly of the suspension of the computing device of FIG. 1, electrically coupled to a controller and angular position sensor.

Referring now to FIG. 7 an alternative magnetic actuation assembly 210 is shown for use in place of one or both of the magnetic actuation assemblies 110 within computing device 10 (see FIGS. 2-6). Magnetic actuation assembly 210 shares common features with magnetic actuation assembly 110, previously described above, and thus, such like features are identified with like reference numerals and the discussion below will focus on the features of magnetic actuation assembly 210 that are different from magnetic actuation assembly 110.

In particular, as shown in FIG. 7, magnetic actuation assembly 210 includes a first actuation member 212, and second actuation member 120 (previously described). First actuation member 212 is generally the same as first actuation member 112, and therefore includes ends 112a, 112b as previously described. However, first actuation member 212 additionally includes another magnet 150 proximate distal end 112b. The magnet 150 within first actuation member 212 is an electromagnet and is coupled (via conductors 147) to controller 140 (namely current generator 148) in the same manner as described above for magnet 150 within second actuation member 120.

During operations, controller 140 actuates magnet 150 with the first actuation member 212 and second actuation member 120 in order to selectively generate a net attractive or repelling magnetic field between distal end 112b of first actuation member 212 and terminal end 123 of recess 122. For example, to generate a net repelling force to urge end 112b of first actuation member 212 away from terminal end 123 of recess 122, controller 140 (via current generator 148) may actuate the magnets 150 within actuation members 212, 120 to generate magnetic fields with aligned, matching magnetic poles (e.g., north-to-north or south-to-south) so that the magnet 150 within the first actuation member 212 is repelled from the magnet 150 within the second actuation member 120. Conversely, to generate a net attractive force to draw distal end 112b of first actuation member 212 toward terminal end 123 of recess 122, controller 140 (via current generator 148) may actuate the magnet 150 within actuation members 212, 120 to generate magnetic fields with aligned, opposite magnetic poles (e.g., north-to-south or south-to-north) so that the magnet 150 within the first actuation member 212 is attracted to the magnet 150 within the second actuation member 120. In some examples, the alignment (or misalignment as the case may be) of the poles of the magnetic fields generated by the magnets 150 within actuation members 212, 120 may be altered by changing the direction of the electric current flowing across one magnet 150 or both magnets 150 via current generator 148 of controller 140 as previously described above.

While not specifically shown in FIG. 7, when alternative magnetic actuation assembly 210 is incorporated within computing device 10 in place of one or both of the magnetic actuation assemblies 110 (see FIGS. 1-4), the magnetic fields generated by alternative magnetic actuation assembly 210 operate to move or transition the corresponding end (e.g., ends 20a, 20b) of display 20 relative to hinge 18 in the same manner as previously described above. However, by including an electromagnet (e.g., magnet 150) within both actuation members 212, 120 of alternative magnetic actuation assembly 210, the magnitude of the magnetic force (e.g., repelling or attracting) applied therebetween may be increased. In addition, in these examples, first actuation member 212 may be entirely constructed from a material that is not magnetically sensitive, thereby potentially reducing costs and weight for computing device 10.

Figure 8:
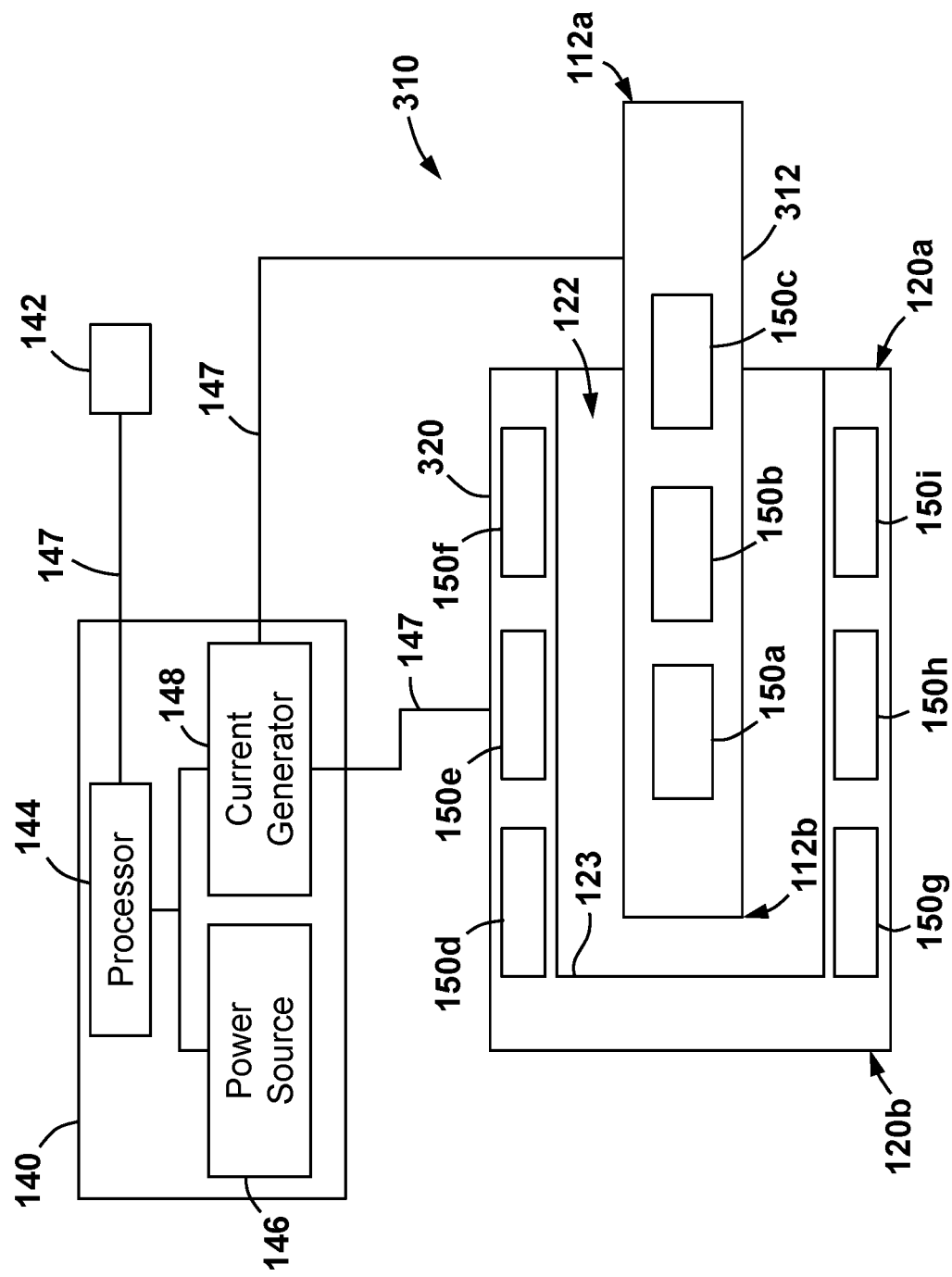
FIG. 8 is a schematic view of another example magnetic actuation assembly of the suspension of the computing device of FIG. 1, electrically coupled to a controller and angular position sensor.

Referring now to FIG. 8, another alternative magnetic actuation assembly 310 is shown for use in place of one or both of the magnetic actuation assemblies 110 within computing device 10 (see FIGS. 2-6). Magnetic actuation assembly 310 shares common features with magnetic actuation assemblies 110, previously described above, and thus, such like features are identified with like reference numerals and the discussion below will focus on the features of magnetic actuation assembly 310 that are different from those included within magnetic actuation assemblies 110.

In particular, as shown in FIG. 8, magnetic actuation assembly 310 includes a first actuation member 312, and a second actuation member 320. First actuation member 312 is generally the same as first actuation member 112, and therefore includes ends 112a, 112b as previously described. However, first actuation member 312 additionally includes a plurality of magnets 150 disposed on or therein, between ends 112a, 112b. In particular, in this example, first actuation member 312 includes a total of three magnets 150—namely a first magnet 150a proximate distal end 112b, a second magnet 150c proximate end 112a, and a third magnet 150b between magnets 150a, 150c. Magnets 150a-c may be either disposed within first magnetic actuation member 312, or may be disposed along an outer surface of first actuation member 312.

Second actuation member 320 is generally the same as first actuation member 120, and therefore includes ends 120a, 120b, and recess 122 having terminal end 123 as previously described. However, second actuation member 320 includes a plurality of magnets 150 in place of the magnet 150 included in second actuation member 120 shown in FIG. 5. In particular, in this example, second actuation member 320 includes a total of six magnets 150—namely a first pair of magnets 150d, 150g disposed on opposing sides of recess 122 and proximate closed end 120b, a second pair of magnets 150f, 150i disposed on opposing sides of recess 122 and proximate open end 120a, and a third pair of magnets 150e, 150h disposed on opposing sides of recess 122 and between the pair of magnets 150d, 150g and the pair of magnets 150f, 150i. In some examples, each pair of magnets (e.g., magnets 150d, g, magnets 150e, h, magnets 150f, i, etc.) is replaced with a single corresponding magnet. In some specific examples, second actuation member 320 is formed as a tubular or enclosed member such that recess 122 is formed as a bore extending inward from open end 120a. In these examples, the pairs of magnets 150d, g, 150e, h, and 150f, i may each be replaced with a single magnet 150 extending angularly about recess 122 (i.e., a total of three magnets disposed between ends 120a, 120b and extending partially or fully angularly about recess 122). Further, as with first actuation member 312, the magnets 150d-i may be either disposed within second magnetic actuation member 320, or may be disposed along an outer surface(s) of second magnetic actuation member 320 or along the surface defining recess 122.

In this example, magnets 150a-i are electromagnets that are each coupled (via conductors 147—not all of the conductors 147 are shown in FIG. 8 to simplify the figure) to controller 140 (namely current generator 148). Thus, controller 140 (via current generator 148) may selectively actuate the magnets 150a-i (or a select number thereof) to generate a corresponding magnetic field, and may alter the poles of those magnetic fields by reversing the flow of electrical current through the corresponding magnet (i.e., magnet 150a-i) as previously described above.

During operations, controller 140 actuates a desired combination of the magnets 150a-c within (or on) first actuation member 312 and the magnets 150d-i within (or on) second actuation member 320 in order to selectively generate a net attractive or repelling magnetic field between first actuation member 312 and recess 122 of second actuation member 320. Specifically, depending on the location of first actuation member 312 within recess 122 (which is a function of the relative position of ends 20a, 20b of display 20 within housing members 14, 16 as previously described—see e.g., FIGS. 2-4), controller 140 may actuate select magnets 150a-i to generate a desired force (e.g., attractive, repelling, or combination thereof) to position first actuation member 312 within recess 122. In addition, controller 140 may also selectively actuate the select magnets 150a-i to generate a magnetic field of varying strength as previously described above to further ensure the desired force on first actuation member 312 and ultimately the desired position of ends 20a, 20b of display 20. In some examples, the choice of magnets 150a-i to actuate and the choice of magnetic field strength to apply to the select magnets 150a-i is a function of the relative angular position of housing members 14, 16 about hinge 18 as previously described above for the example of FIGS. 2-6.

While not specifically shown in FIG. 8, when magnetic actuation assembly 310 is incorporated within computing device 10 in place of one or both of the magnetic actuation assemblies 110 (see FIGS. 2-4), the magnetic field generated by magnetic actuation assembly 310 operates to move or transition the corresponding end (e.g., ends 20a, 20b) of display 20 relative to hinge 18 in the same manner as previously described above. However, by including a plurality of electromagnets (e.g., magnets 150a-i) within both of the actuation members 312, 320 of magnetic actuation assembly 310, the magnitude and location of the magnetic force (e.g., repelling or attracting) between first actuation member 312 and second actuation member 320 (and thus ultimately ends 20a, 20b of display 20) may be more finely controlled. In addition as with the example of FIG. 7, in the example of FIG. 8, first actuation member 312 may be entirely constructed from a material that is not magnetically sensitive, thereby potentially reducing costs and weight for computing device 10.

Figure 9:
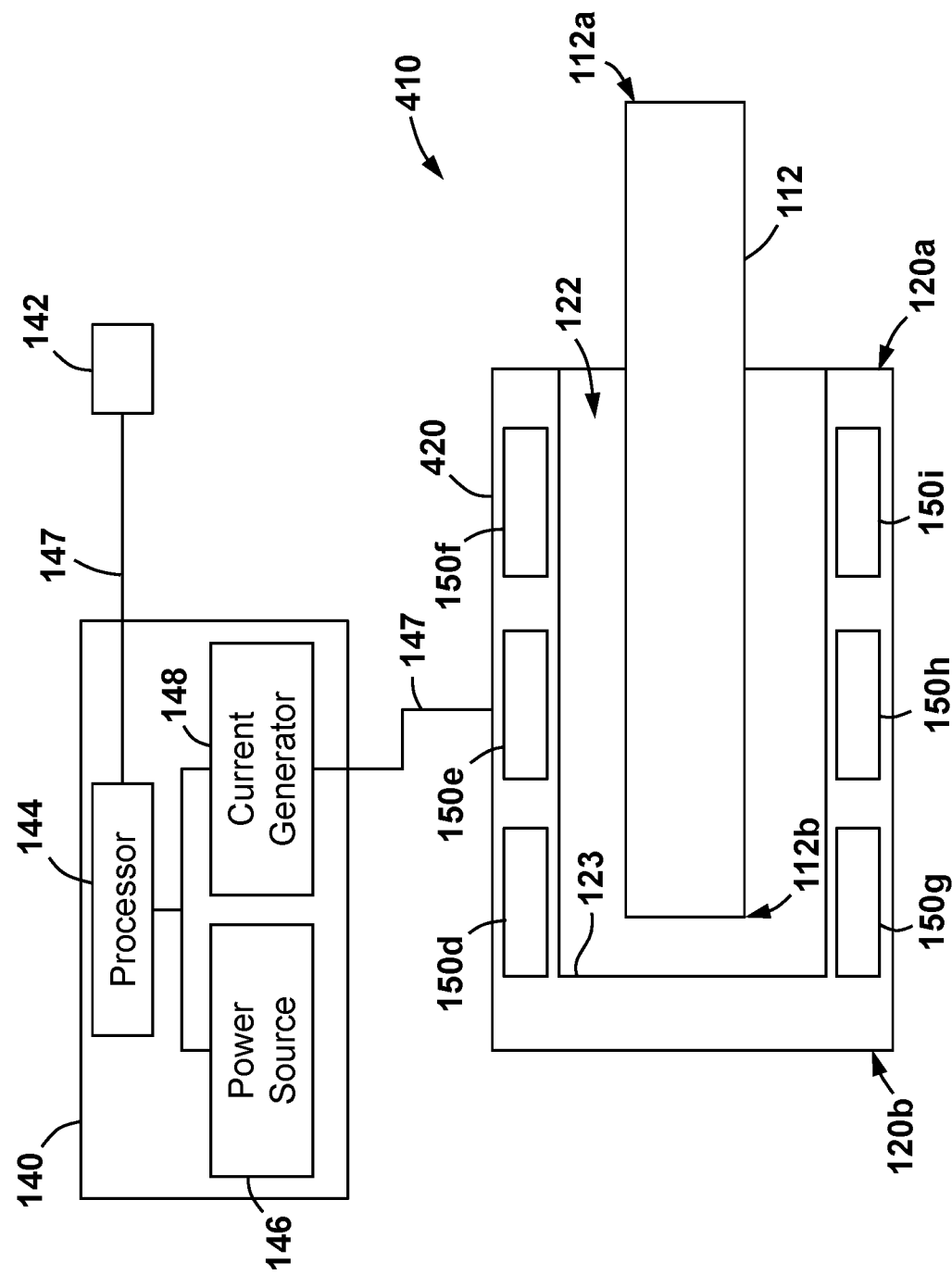
FIG. 9 is a schematic view of another example magnetic actuation assembly of the suspension of the computing device of FIG. 1, electrically coupled to a controller and angular position sensor.

Referring now to FIG. 9, another alternative magnetic actuation assembly 410 is shown for use in place of one or both of the magnetic actuation assemblies 110 within computing device 10 (see FIGS. 2-6). Magnetic actuation assembly 410 shares common features with both magnetic actuation assembly 110 and magnetic actuation assembly 310 previously described above, and thus, such like features are identified with like reference numerals and the discussion below will focus on the features of magnetic actuation assembly 410 that are different from magnetic actuation assemblies 110, 310.

In particular, as shown in FIG. 9, magnetic actuation assembly 410 includes the first actuation member 112 included within the magnetic actuation assemblies 110 of FIGS. 2-6, and the second actuation member 320 included within the magnetic actuation assembly 310 of FIG. 8. Accordingly, it should be appreciated that the first and second magnetic actuation members 112 and 320, respectively, are the same as previously described above.

During operations, controller 140 actuates select magnets 150d-i within (or on) second actuation member 320 in order to selectively generate a net attractive or repelling magnetic field between first actuation member 112 and terminal end 123 of recess 122 within second actuation member 320. Specifically, depending on the location of first actuation member 112 within recess 122 (which is a function of the relative position of ends 20a, 20b of display 20 within housing members 14, 16 as previously described—see e.g., FIGS. 2-4), controller 140 may actuate select magnets 150d-i to generate a desired force (e.g., attractive, repelling, or combination thereof) to position first actuation member 112 within recess 122 as desired. In addition, controller 140 may also selectively actuate the select magnets 150d-i to generate a magnetic field of varying strength as previously described above to further ensure the desired force on first actuation member 112 and ultimately the desired position of ends 20a, 20b of display 20. In some examples, the choice of magnets 150d-i to actuate and the choice of magnetic field strength to be applied by the select magnets 150d-i is a function of the relative angular position of housing members 14, 16 about hinge 18 as previously described above for the example of FIGS. 2-6. It should be noted that in this example, first magnetic actuation member 112 is constructed (partially or wholly) from a magnetically sensitive material as previously described above.

While not specifically shown in FIG. 9, when magnetic actuation assembly 410 is incorporated within computing device 10 in place of one or both of the magnetic actuation assemblies 110 (see FIGS. 1-4), the magnetic field generated by magnetic actuation assembly 410 operates to move or transition the corresponding end (e.g., ends 20a, 20b) of display 20 relative to hinge 18 in the same manner as previously described above. However, by including a plurality of electromagnets (e.g., magnets 150) within second actuation member 320, the magnitude and characteristics of the magnetic force (e.g., repelling or attracting) that may be applied to first actuation member 112 (and thus ultimately ends 20a, 20b of display 20) may be more finely controlled.

While examples specifically depicted herein have included computing devices where both ends (e.g., ends 20a, 20b) of a flexible display (e.g., flexible display 20) are movable relative to a central hinge (e.g., hinge 18) of a housing of the device (e.g., housing 12), in other examples, a single end of the display is movable relative to the hinge while the opposite end is fixed relative to the housing. For example, referring now to FIGS. 10 and 11, a computing device 500 is shown. Computing device 500 is generally the same as computing device 10 of FIGS. 1-4, and 6, and thus, like components between computing devices 10, 500 are identified with like reference numerals, and the discussion below will focus on the components and features of computing device 500 that are different from computing device 10.

As shown in FIGS. 10 and 11, in this example, computing device 500 includes housing 12, flexible display 20, and display support members 130, 132, each being the same as previously described above for computing device 10. In addition, computing device 500 includes a suspension 510 in place of suspension 100. FIG. 10 shows housing 12 of computing device 500 in a closed position and FIG. 11 shows housing 12 of computing device 500 in an open position.

In this example, second end 20b of flexible display 20 is fixed to second housing member 16 via second display support member 132, and thus, suspension 510 facilitates the movement of first end 20a of flexible display 20 relative to hinge 18. In particular, suspension 510 includes a magnetic actuation assembly 110 disposed within first housing member 14 which further includes first magnetic actuation member 112 and second magnetic actuation member 120, each being the same as previously described above for computing device 10 (see FIGS. 1-4). However, because second end 20b of flexible display 20 is fixed relative to second housing member 16 via display support member 132, no magnetic actuation assembly 110 is included within second housing member 16. In other example, suspension 510 of computing device 500 may include any of the other magnetic actuation assemblies 210, 310, 410 in place of magnetic actuation assembly 110.

During operations, as the housing 12 is transitioned between the closed position (see FIG. 10), neutral position (see e.g., FIG. 4) and the open position (see FIG. 11), second end 20b of flexible display 20 remains fixed relative to hinge 18 and second housing member 16; however, first end 20a translates within first housing member 14 relative to hinge 18 via the magnetic forces applied to first end 20a via magnetic actuation assembly 110 in the same manner as described above for computing device 10. Accordingly, a detailed description of this operation is omitted herein in the interest of brevity. Thus, through use of suspension 510, the desired deformation of flexible display 20 is achieved by moving first end 20a of flexible display 20 synchronously with the movement of housing members 14, 16 about hinge 18.

Figure 12:
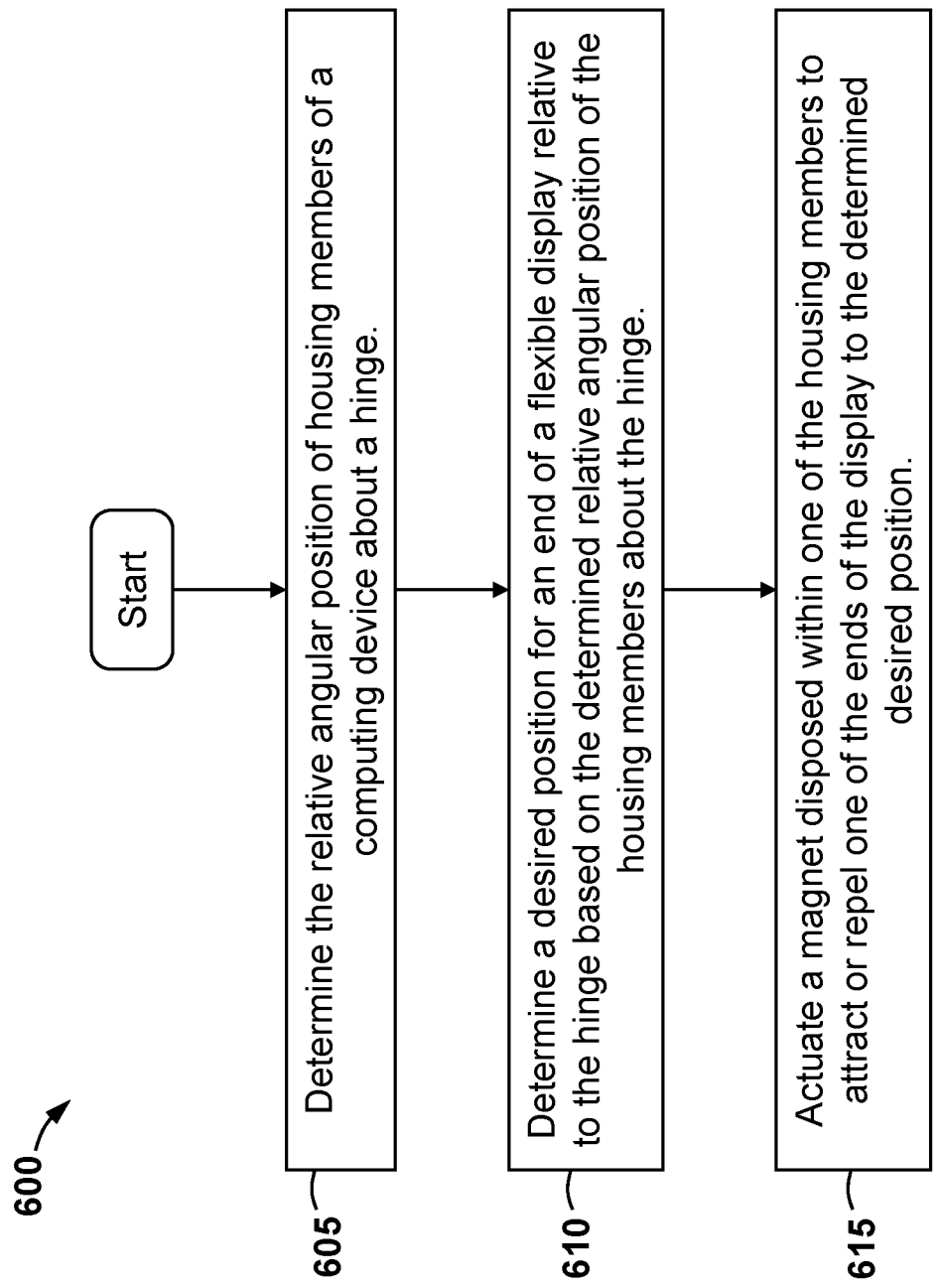
FIG. 12 is a block diagram of a method 600 according to some examples.

Referring now to FIG. 12, a method 600 for actuating the ends (or a single end) of a flexible display of a computing device (e.g., ends 20a, 20b of display 20 in FIG. 1) is shown. In describing the details of method 600, reference will be made to the features and components of computing device 10 (see e.g., FIGS. 1-6); however, it should be appreciated that method 600 may be practiced with other components and features that are different from those shown in computing device 10. Therefore, reference to computing device 10 and its components is merely to enhance the clarity of the description of method 600 and should not be limiting thereto. In addition, method 600 may be carried out by a controller device, e.g., such as controller 140 previously described above.

First method 600 begins at 605 by determining the relative angular position of housing members (e.g., housing members 14, 16) of a computing device about a hinge (e.g., hinge 18). For example, the relative angular position of the housing members may be sensed or determined by an angular position sensor, such as, for example angular position sensor 142 shown in FIGS. 2-4 and previously described above.

Next, method 600 includes determining at 610 a desired position for an end of a flexible display (e.g., ends 20a, 20b of display 20) relative to the hinge based on the determined relative angular position of the housing members about the hinge. For example, the desired position of the end (or ends) of the flexible display may be chosen in order to accommodate a radius or bend of the flexible display proximate the hinge (e.g., such as radius R shown in FIG. 2).

Finally, method 600 includes actuating a magnet disposed within one of the housing members (e.g., magnet 150) to attract or repel one of the ends of the display to the determined desired position at 615. For example, for the computing device 10 of FIGS. 1-6, block 615 may include actuating a magnet 150 within one of the magnetic actuation assemblies 110 (or alternatively one of the magnetic actuation assemblies 210, 310, 410) to actuate one of the ends 20a, 20b of display 20 as previously described above.

Examples disclosed herein have included computing devices utilizing flexible displays that employ suspensions therein for facilitating an acceptable and controlled deformation of the flexible display as the computing device is transitioned between open and closed positions. Accordingly, through use of the example suspensions disclosed herein (and disclosed computing devices including such a suspension), damage and wear to a flexible display caused by the transitioning of the computing device between a closed (or folded) position and an open position may be reduced or eliminated.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:
1. A computing device, comprising:
 a housing comprising a first housing member and a second housing member, wherein the first housing member is rotatably coupled to the second housing member at a hinge;
 a display coupled to the housing, wherein the display comprises a first end disposed on a first side of the hinge and a second end disposed on a second side of the hinge that is opposite the first side, the display being a flexible display that spans over the hinge from the first end to the second end;
a first magnet disposed within the first housing member; and
a controller disposed within the housing, wherein the controller is coupled to the first magnet and is to actuate the first magnet to generate a magnetic field based on a position of the first housing member relative to the second housing member about the hinge, and
wherein the magnetic field is to attract or repel the first end of the display to translate the first end of the display relative to the hinge within the first housing member.

2. The computing device of claim 1, comprising a second magnet coupled to the first end of the display, wherein the controller is coupled to the second magnet and is to actuate the first magnet and the second magnet to generate the magnetic field.

3. The computing device of claim 1, comprising a sensor to detect a position of the first housing member relative to the second housing member about the hinge, wherein the controller is to actuate the first magnet to generate the magnetic field based on an output from the sensor.

4. The computing device of claim 1, wherein the second housing member is to rotate about the hinge relative to the first housing member to transition the housing between:
a first position in which the second housing member is disposed at a first angle to the first housing member about the hinge; and
a second position in which the second housing member is rotated about the hinge toward the first housing member from the first position to a second angle that is less than the first angle;
wherein the controller is to actuate the first magnet to attract the first end of the display away from the hinge when the housing is transitioned from the second position to the first position; and
wherein the controller is to actuate the first magnet to repel the first end of the display toward the hinge when the housing is transitioned from the first position toward the second position.

5. The computing device of claim 1, comprising a plurality of first magnets disposed within the first housing member, wherein the controller is coupled to the plurality of first magnets and is to actuate the plurality of first magnets to generate the magnetic field.

6. The computing device of claim 5, comprising a plurality of second magnets coupled to the first end of the display, wherein the controller is coupled to the plurality of second magnets and is to actuate the plurality of first magnets and the plurality of second magnets to generate the magnetic field.

7. The computing device of claim 6, wherein the plurality of first magnets and the plurality of second magnets are electromagnets.

8. A computing device, comprising:
a hinge having a first side and a second side opposite the first side;
a housing comprising a first housing member and a second housing member rotatably coupled to the first housing member at the hinge;
a flexible display coupled to the housing, wherein the flexible display comprises a first end disposed on the first side and a second end disposed on the second side, the display spanning over the hinge from the first end to the second end;
a first magnet disposed within the first housing member;
a second magnet disposed within the second housing member; and
a controller disposed within the housing, wherein the controller is coupled to the first magnet and the second magnet and is to actuate the first magnet and the second magnet to generate a first magnetic field and a second magnetic field, respectively, based on a position of the first housing member relative to the second housing member about the hinge;
wherein the first magnetic field is to attract or repel the first end of the display to translate the first end of the display relative to the hinge within the first housing member; and
wherein the magnetic the second magnetic field is to attract or repel the second end of the display to translate the second end of the display relative to the hinge within the second housing member.

9. The computing device of claim 8, wherein the second housing member is to rotate about the hinge relative to the first housing member to transition the housing between:
a first position in which the second housing member is disposed at a first angle to the first housing member about the hinge; and
a second position in which the second housing member is rotated about the hinge toward first housing member, from the first position, to a second angle that is less than the first angle;
wherein when the housing is transitioned from the second position to the first position, the controller is to:
actuate the first magnet to attract the first end of the display away from the hinge within the first housing member; and
actuate the second magnet to attract the second end of the display away from the hinge within the second housing member.

10. The computing device of claim 9, wherein when the housing is transitioned from the first position toward the second position, the controller is to:
actuate the first magnet to repel the first end of the display toward the hinge within the first housing member; and
actuate the second magnet to repel the second end of the display toward the hinge within the second housing member.

11. The computing device of claim 10, comprising a sensor to detect a position of the first housing member relative to the second housing member about the hinge, wherein the controller is to actuate the first magnet and the second magnet to generate the first magnetic field and the second magnetic field based on an output from the sensor.

12. The computing device of claim 8, comprising:
a plurality of first magnets disposed within the first housing member; and
a plurality of second magnets disposed within the second housing member;
wherein the controller is coupled to the first plurality of magnets and the second plurality of magnets; and
wherein the controller is to actuate the first plurality of magnets to generate the first magnetic field and is to actuate the second plurality of magnets to generate the second magnetic field based on the position of the first housing member relative to the second housing member about the hinge.

13. The computing device of claim 12, comprising:
a plurality of third magnets coupled to the first end of the display;
a plurality of fourth magnets coupled to the second end of the display;

wherein the controller is coupled to the plurality of third magnets and the plurality of fourth magnets; and wherein the controller is to actuate the plurality of first magnets and the plurality of third magnets to generate the first magnetic field; and wherein the controller is to actuate the plurality of second magnets and the plurality of fourth magnets to generate the second magnetic field.

14. A computing device, comprising:

a hinge having a first side and a second side opposite the first side;

a housing comprising a first housing member and a second housing member rotatably coupled to the first housing member at the hinge;

a display coupled to the housing, wherein the display comprises a first end disposed on the first side and a second end disposed on the second side, the display being a flexible display that spans over the hinge from the first end to the second end;

a first magnet disposed within the first housing member;

a second magnet disposed within the second housing member; and a controller disposed within the housing, wherein the controller is coupled to the first magnet and the second magnet;

wherein when the second housing member is rotated about the hinge toward the first housing member, the controller is to:
actuate the first magnet to repel the first end of the display toward the hinge within the first housing member; and
actuate the second magnet to repel the second end of the display toward the hinge within the second housing member; and wherein when the second housing member is rotated about the hinge and away from the first housing member, the controller is to:
actuate the first magnet to attract the first end of the display away from the hinge within the first housing member; and
actuate the second magnet to attract the second end of the display away from the hinge within the second housing member.

15. The computing device of claim 14, comprising:

a plurality of first magnets disposed within the first housing member;

a plurality of second magnets disposed within the second housing member;

wherein the controller is coupled to the plurality of first magnets and the plurality of second magnets; and wherein when the second housing member is rotated about the hinge toward the first housing member, the controller is to:
actuate the plurality of first magnets to repel the first end of the display toward the hinge within the first housing member; and
actuate the plurality of second magnets to repel the second end of the display toward the hinge within the second housing member; and wherein when the second housing member is rotated about the hinge and away from the first housing member, the controller is to:
actuate the plurality of first magnets to attract the first end of the display away from the hinge within the first housing member; and
actuate the plurality of second magnets to attract the second end of the display away from the hinge within the second housing member.

* * * * *